United States Patent
Yilmaz

(10) Patent No.: US 12,122,313 B2
(45) Date of Patent: Oct. 22, 2024

(54) SEATBELT BUCKLE ENGAGEMENT DETECTION

(71) Applicant: MAGNA ELECTRONICS, LLC, Southfield, MI (US)

(72) Inventor: Mehmet Fatih Yilmaz, Southfield, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 457 days.

(21) Appl. No.: 17/169,088

(22) Filed: Feb. 5, 2021

(65) Prior Publication Data

US 2022/0250570 A1    Aug. 11, 2022

(51) Int. Cl.
| | |
|---|---|
| B60R 21/015 | (2006.01) |
| B60R 21/01 | (2006.01) |
| B60R 22/48 | (2006.01) |
| G01B 11/14 | (2006.01) |

(52) U.S. Cl.
CPC ............ *B60R 21/015* (2013.01); *B60R 22/48* (2013.01); *G01B 11/14* (2013.01); *B60R 2021/01272* (2013.01); *B60R 2022/4825* (2013.01); *B60R 2022/4841* (2013.01); *B60R 2022/4866* (2013.01)

(58) Field of Classification Search
CPC .................. B60R 21/015; B60R 22/48; B60R 2021/01272; B60R 2022/4825; B60R 2022/4841; B60R 2022/4866; B60R 2022/485; G01B 11/14
See application file for complete search history.

(56) References Cited

U.S. PATENT DOCUMENTS

| | | | |
|---|---|---|---|
| 10,997,440 B2* | 5/2021 | Ohno | B60R 1/00 |
| 2007/0195990 A1* | 8/2007 | Levy | G06V 10/225 |
| | | | 340/457.1 |
| 2015/0251618 A1* | 9/2015 | Ghannam | B60R 22/48 |
| | | | 340/457.1 |
| 2020/0254965 A1* | 8/2020 | Kim | B60R 22/24 |
| 2021/0394710 A1* | 12/2021 | Hu | B60W 40/09 |

FOREIGN PATENT DOCUMENTS

GB      2602830 A * 7/2022 ............. B60R 22/48

* cited by examiner

*Primary Examiner* — Tyler J Lee
*Assistant Examiner* — Kimia Kohankhaki
(74) *Attorney, Agent, or Firm* — DICKINSON WRIGHT PLLC

(57) ABSTRACT

A method and system for determining whether a seatbelt of a vehicle is fastened is provided. The system may be configured to detect markers on a seatbelt, engage seatbelt tensioners, and determine whether the markers have moved. The system may then be configured to determine whether the seatbelt is fastened based on movement of the markers.

20 Claims, 10 Drawing Sheets

SEATBELT BUCKLE ENGAGEMENT DETECTION

BACKGROUND

Field of the Invention

The present application generally relates to systems and methods for detecting whether a seatbelt is fastened.

Description of Related Art

Cameras and other image detection devices have been utilized to detect one or more objects. Control systems that are in communication with these cameras can receive images captured by the cameras and process these images. The processing of these images can include detecting one or more objects found in the captured images.

These applications may be especially challenging in dynamic environments such as vehicle environments. Further difficulties are also introduced when variables such a people are introduced into the environment with the objects to be detected.

SUMMARY

A method and system for determining whether a seatbelt of a vehicle is fastened is provided. The system may be configured to detect markers on a seatbelt, engage seatbelt tensioners, and determine whether the markers have moved. The system may then be configured to determine whether the seatbelt is fastened based on movement of the markers.

Further objects, features, and advantages of this invention will become readily apparent to persons skilled in the art after a review of the following description, with reference to the drawings and claims that are appended to and form a part of this specification.

DETAILED DESCRIPTION

Figure 1:
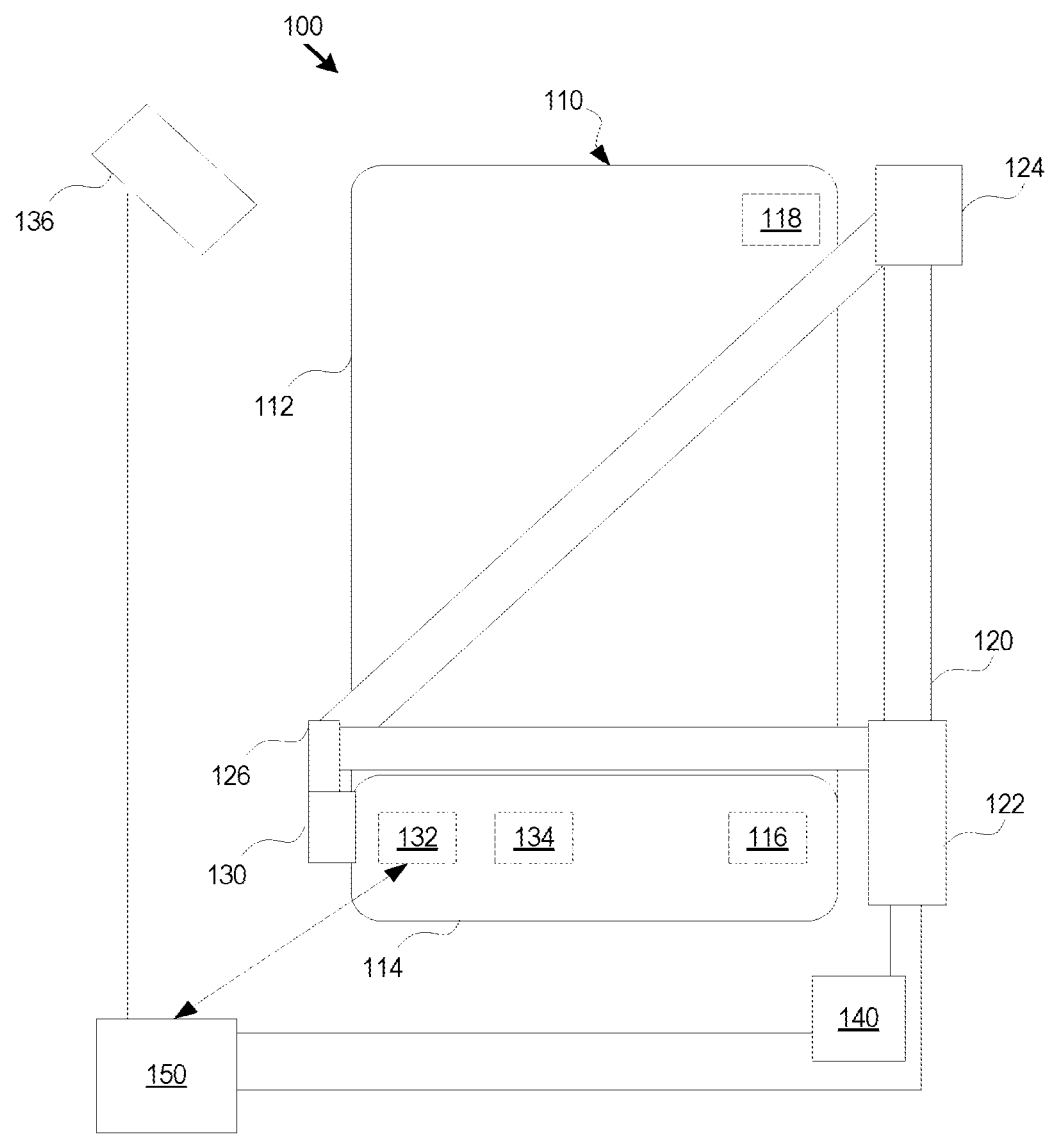
FIG. 1 is a diagram illustrating a seatbelt monitoring system.

FIG. 1 is a block diagram of a system 100 for monitoring whether a seatbelt is fastened. The seat 110 includes a back portion 112 and a bottom portion 114. One or more occupant restraints, for example airbags or seatbelt retractors, may be integrated into the seat 110. In one example, airbag 116 may be located in the bottom portion 114 of the seat 110 to protect the occupant's legs while deploying between the seat and door. In another example, a safety device such as an airbag 118 may be positioned to deploy between the seat back and the door or side window of the vehicle.

The vehicle may include a power supply 140 and a control unit 150 for controlling occupant restraints within the seat 110. The system may include a seatbelt controller 122. The seatbelt controller 122 may include a seatbelt retractor and/or a pre-tensioner to provide tension to the seatbelt 120. The seatbelt 120 may extend from the controller to an anchor unit 124. In other implementations, the seatbelt may originate from the anchor unit 124. The anchor unit 124 may be attached to the vehicle for example, at a pillar between the side windows. In some implementations, the anchor unit 124 may include a seatbelt retractor to maintain tension on the seatbelt 120.

The seatbelt 120 may extend from the anchor unit 124 to a latch plate assembly 126. The latch plate assembly 126 may be configured to engage with and be locked into a buckle assembly 130. The buckle assembly 130 may be affixed to the seat 110. The seatbelt 120 may extend from the latch plate assembly 126 across the bottom portion 114 of the seat back to the seatbelt controller 122.

In some implementations, the seatbelt 120 may include a pattern integrated into the webbing of the seatbelt 120. A sensor 136 may be configured to detect the pattern on the seatbelt. The sensor may be a camera with an imaging sensor and may include an illumination source. The markers may be undetectable in the visible light spectrum. However, the markers may be visible in a wavelength other than the visible spectrum (e.g. infra-red, near infra-red, or ultra-violet). As such, the imaging sensor of the camera may be sensitive to infra-red, near infra-red, or ultra-violet and an illumination source may provide light in the infra-red, near infra-red, or ultra-violet wavelengths.

The pattern may be formed of one or more unique shapes. The pattern may also be formed from one or more lines of varying size, width, length, orientation, or other characteristics that allow the camera 136 to identify the location of the pattern in a first image (e.g. before the seatbelt tensioner is active) and a second location of the pattern in a second image (e.g. after the seatbelt tensioner is active).

The control circuit 132 may control deployment of the safety devices, for example airbag 116 and airbag 118, as well as other electronic functionality within the removable seat 110. The control circuit 132 may also control charging of the battery 134, as well as, other accessory functionality such as seat heating, seat cooling, or seat motion. In some implementations, the controller 150 may communicate with the control circuit 132 through a cable or wirelessly in the seat to control deployment of the safety devices and/or other electronic functionality within the seat as described above.

Figure 2:
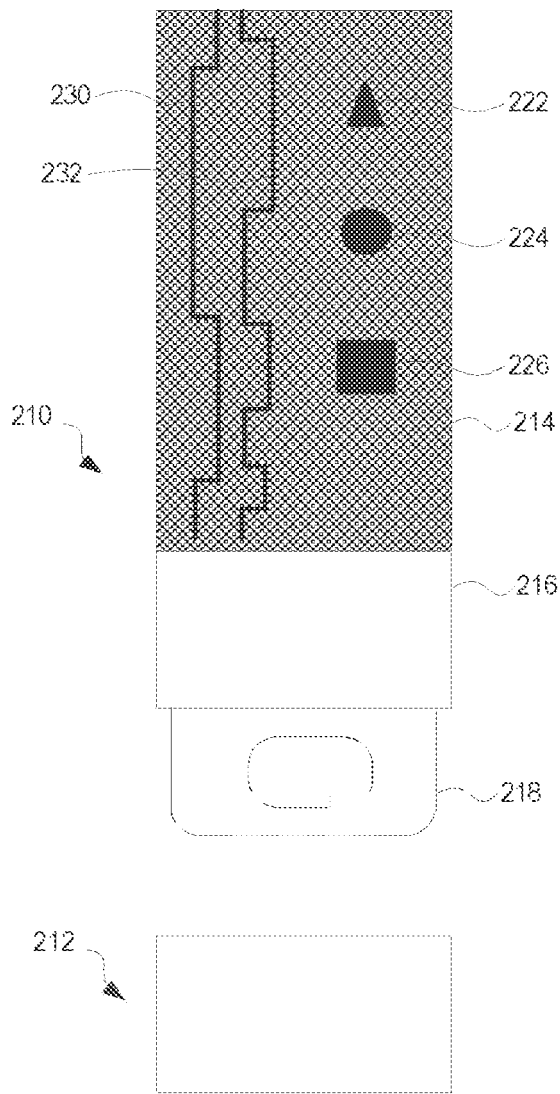
FIG. 2 is a diagram illustrating one implementation of a seatbelt for the seatbelt monitoring system.

FIG. 2 illustrates one implementation of a latch plate assembly and a buckle assembly for attaching the seatbelt to the seat. A latch plate assembly 210 may be configured to provide a locking engagement with a buckle assembly 212. The latch plate assembly 210 may include housing 216 and a tongue 218 extending from the housing 216. The latch plate assembly 210 may be securely connected to the seatbelt webbing 214. The tongue 218 may include a hole, notches, or other features that may be engaged by one or more locking features within the buckle assembly 212 to securely connect the seatbelt to the seat. The seatbelt webbing 214 may include one or more patterns. The patterns may be implemented with a material that is not visible when illuminated with the visible light spectrum. However, the material used to form the pattern may be visible when illuminated with and/or viewed by a detector sensitive to wavelengths that are not in the visible light spectrum, for example infra-red, near infra-red, or ultra-violet wavelengths. The patterns may be placed on the surface of the seatbelt 214 or, in some implementations, may be woven into the seatbelt webbing 214.

The pattern may be formed of one or more unique shapes, such as the triangle 222, the circle 224, and the square 226 depicted. Each unique pattern can be distinguished by the camera and the location of each pattern can be identified in an image. The pattern may also be formed from one or more lines of varying size, width, length, orientation, or other characteristics that allow the camera 136 to identify the location of the pattern in a first image (e.g. before the seatbelt tensioner is active) and a second location of the pattern in a second image (e.g. after the seatbelt tensioner is active). For example, line 230 and line 232 can be used together to identify the distance that the seatbelt moved between the first image prior to tensioning and the second image after tensioning.

Figure 3:
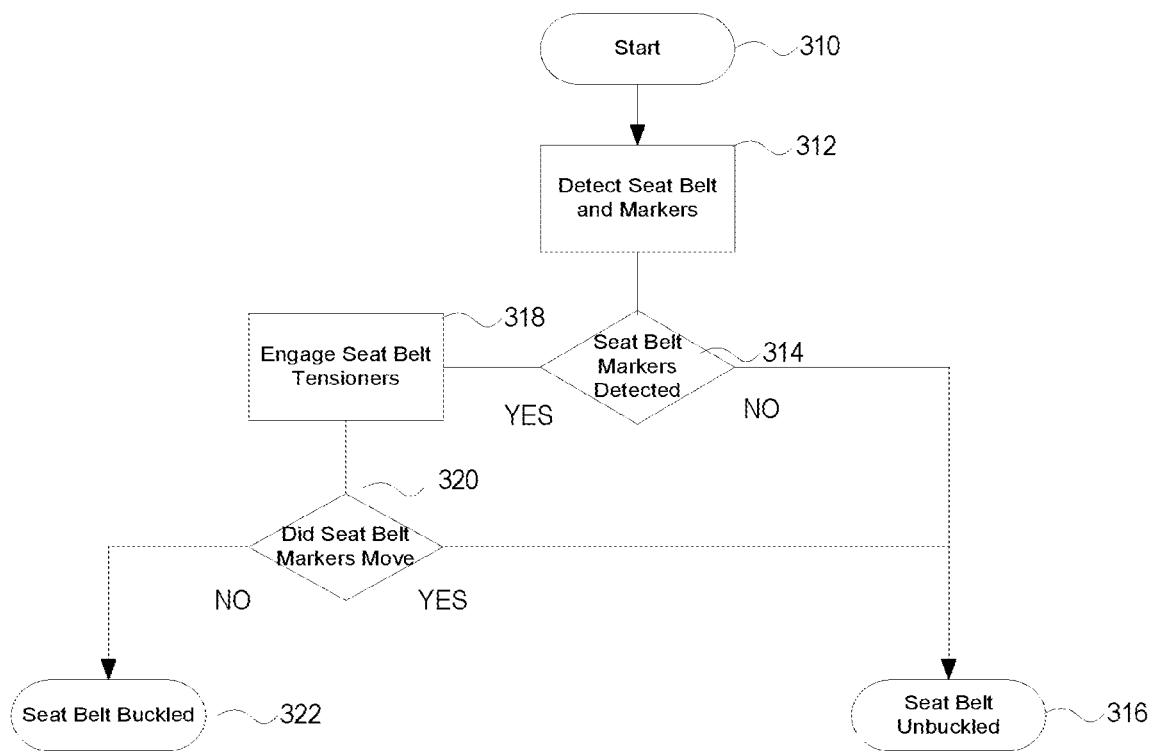
FIG. 3 is a flow chart illustrating a method for determining whether a seatbelt is fastened.

FIG. 3 is a flow chart illustrating one method for detecting whether a seatbelt is fastened. The method begins in block 310. In block 312, the system detects the seatbelt and any markers on the seatbelt. These may be detected, for example, by a camera. The markers may be invisible in the visible light spectrum. However, the markers may be visible in a wavelength other than the visible spectrum (e.g. infra-red, near infra-red, or ultra-violet). As such, the imaging sensor of the camera may be sensitive to infra-red, near infra-red, or ultra-violet and an illumination source may provide light in the infra-red, near infra-red, or ultra-violet wavelengths.

In block 314, the system determines whether the seatbelt markers are identified. If the seatbelt markers are not identified, the method proceeds to block 316. In block 316, the system determines that the seatbelt is unbuckled. The system may take appropriate action, for example, notifying the occupants, adjusting safety parameters, or other actions as discussed elsewhere in this application. As such, the driver may be alerted or action may be taken in response to a difference between the first location and the second location.

If the system determines that the seatbelt markers are not identified in block 314, the method proceeds to block 318. In block 318, the seatbelt is put under tension, for example, by activating the seatbelt tensioner. In block 320, the system determines whether the seatbelt markers moved. For example, the system may determine whether the seatbelt markers moved greater than a threshold distance. This may be done by comparing a first image taken before the seatbelt is tensioned to a second image taken after the seatbelt is tensioned. In some implementations, a first location determined from the first image may be compared to a second location determined from the second image.

If the system determines that the markers have moved (e.g. greater than a threshold distance) in block 320, the system determines that the seatbelt is unbuckled as illustrated in block 316. If the system determines, in block 320, that the markers have not moved (e.g. movement less than a threshold distance) then the system determines that the seatbelt is fastened as illustrated by block 322.

The method may be initiated in response to various events. For example, the method may be initiated (e.g. identify the first location, identify the second location and determine whether the seatbelt is fastened) in response to a door of the vehicle opening, the vehicle starting or stopping, and/or a time period has elapsed since last determining whether the seatbelt is fastened.

Figure 4:
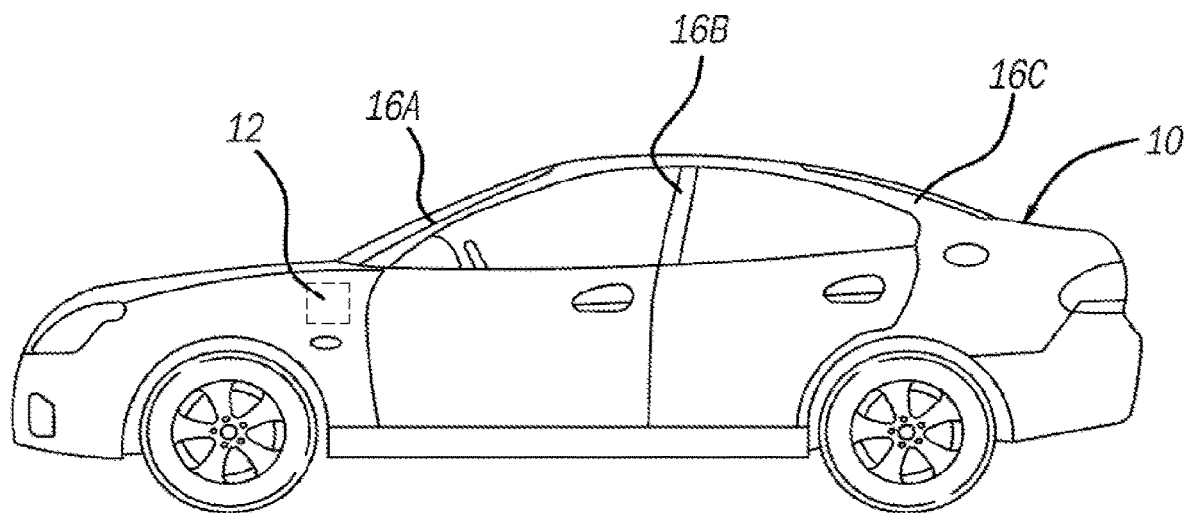
FIG. 4 illustrates a vehicle having a system for determining whether a seatbelt is fastened.

Referring to FIG. 4, illustrated is a vehicle 10 having a control system 12 for detecting objects. In this example, the control system 12 has been incorporated within the vehicle 10. However, it should be understood that the control system 12 could be a standalone system separate from the vehicle 10.

As to the vehicle 10, the vehicle 10 is shown in FIG. 4 as a sedan type automobile. However, it should be understood that the vehicle 10 may be any type of vehicle capable of transporting persons or goods from one location to another. As such, the vehicle 10 could, in addition to being a sedan type automobile, could be a light truck, heavy-duty truck, tractor-trailer, tractor, mining vehicle, and the like. Also, it should be understood that the vehicle 10 is not limited to wheeled vehicles but could also include non-wheeled vehicles, such as aircraft and watercraft. Again, the term vehicle should be broadly understood to include any type of vehicle capable of transporting persons or goods from one location to another and it should not be limited to the specifically enumerated examples above.

Figure 5:
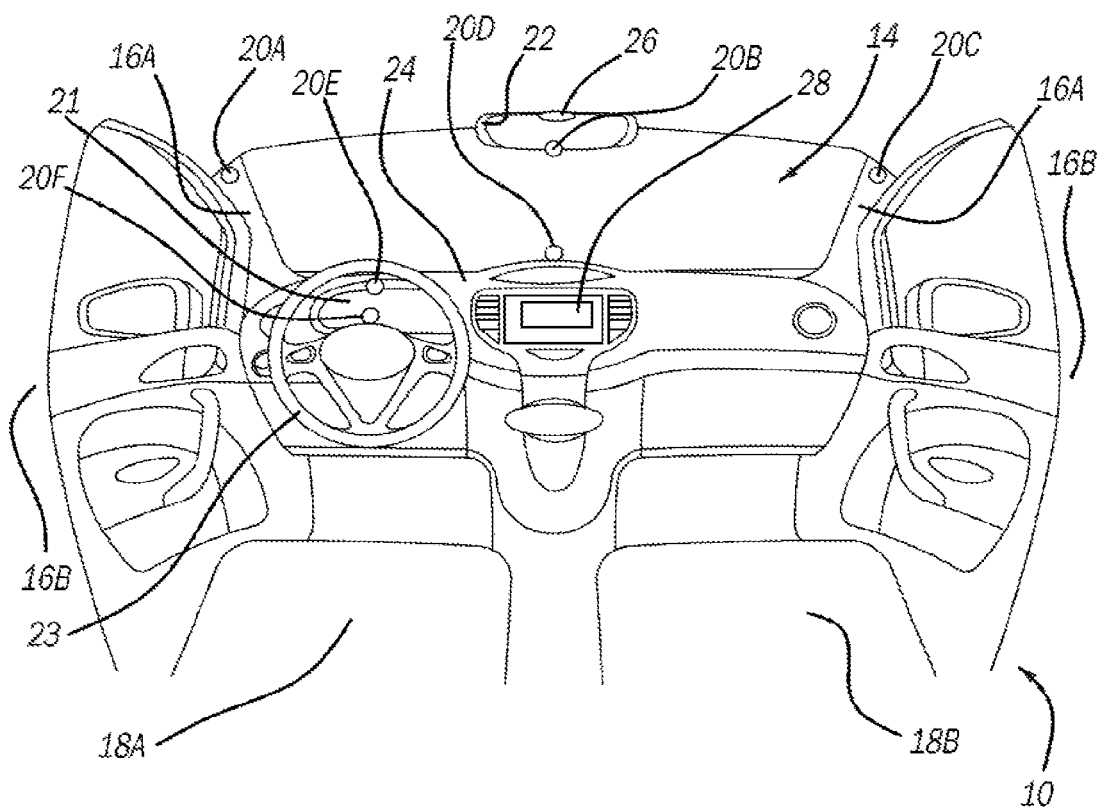
FIG. 5 illustrates a forward looking view of a cabin of the vehicle having a system for determining whether a seatbelt is fastened.

Referring to FIG. 5, a cabin 14 of the vehicle 10 is shown. As it is well understood in the art, the cabin 14 is essentially the interior of the vehicle 10 wherein occupants and/or goods are located when the vehicle is in motion. The cabin 14 of the vehicle may be defined by one or more pillars that structurally define the cabin 14. For example, in FIG. 5, A-pillars 16A and B-pillars 16B are shown. FIG. 4 further illustrates that there may be a third pillar or a C-pillar 16C. Of course, it should be understood that the vehicle 10 may contain any one of a number of pillars so as to define the cabin 14. Additionally, it should be understood that the vehicle 10 may be engineered so as to remove these pillars, essentially creating an open-air cabin 14 such as commonly found in automobiles with convertible tops.

Located within the cabin 14 are seats 18A and 18B. The seats 18A and 18B are such that they are configured so as to support an occupant of the vehicle 10. The vehicle 10 may have any number of seats. Furthermore, it should be understood that the vehicle 10 may not have any seats at all.

The vehicle 10 may have one or more cameras 20A-20F located and mounted to the vehicle 10 so as to be able to have a field a view of at least a portion of the cabin 14 that function as part of a vision system. As such, the cameras 20A-20F may have a field of view of the occupants seated in the seats 18A and/or 18B. Here, cameras 20A and 20C are located on the A-pillars 16A. Camera 20B is located on a rearview mirror 22. Camera 20D may be located on a dashboard 24 of the vehicle 10. Camera 20E and 20F may focus on the driver and/or occupant and may be located adjacent to the vehicle cluster 21 or a steering wheel 23, respectively. Of course, it should be understood that any one of a number of different cameras may be utilized. As such, it should be understood that only one camera may be utilized or numerous cameras may be utilized. Furthermore, the cameras 20A-20F may be located and mounted to the vehicle 10 anywhere so long as to have a view of at least a portion of the cabin 14.

The cameras 20A-20F may be any type of camera capable of capturing visual information. This visual information may be information within the visible spectrum, but could also be information outside of the visible spectrum, such as infrared or ultraviolet light. Here, the cameras 20A-20F are infrared cameras capable of capturing images generated by the reflection of infrared light. The source of this infrared light could be a natural source, such as the sun, but could also be an artificial source such as an infrared light source 26. The infrared light source 26 may be mounted anywhere within the cabin 14 of the vehicle 10 so as to be able to project infrared light into at least a portion of the cabin 14. Here, the infrared light source 26 is mounted to the rearview mirror 22 but should be understood that the infrared light source 26 may be mounted anywhere within the cabin 14. Additionally, it should be understood that while only one infrared light source 26 is shown, there may be more than one infrared light source located within the cabin 14 of the vehicle 10.

Also located within the cabin 14 may be an output device 28 for relaying information to one or more occupants located within the cabin 14. Here, the output device 28 is shown in a display device so as to convey visual information to one or more occupants located within the cabin 14. However, it should be understood that the output device 28 could be any output device capable of providing information to one or more occupants located within the cabin 14. As such, for example, the output device may be an audio output device that provides audio information to one or more occupants located within the cabin 14 of a vehicle 10. Additionally, should be understood that the output device 28 could be a vehicle subsystem that controls the functionality of the vehicle.

Figure 6:
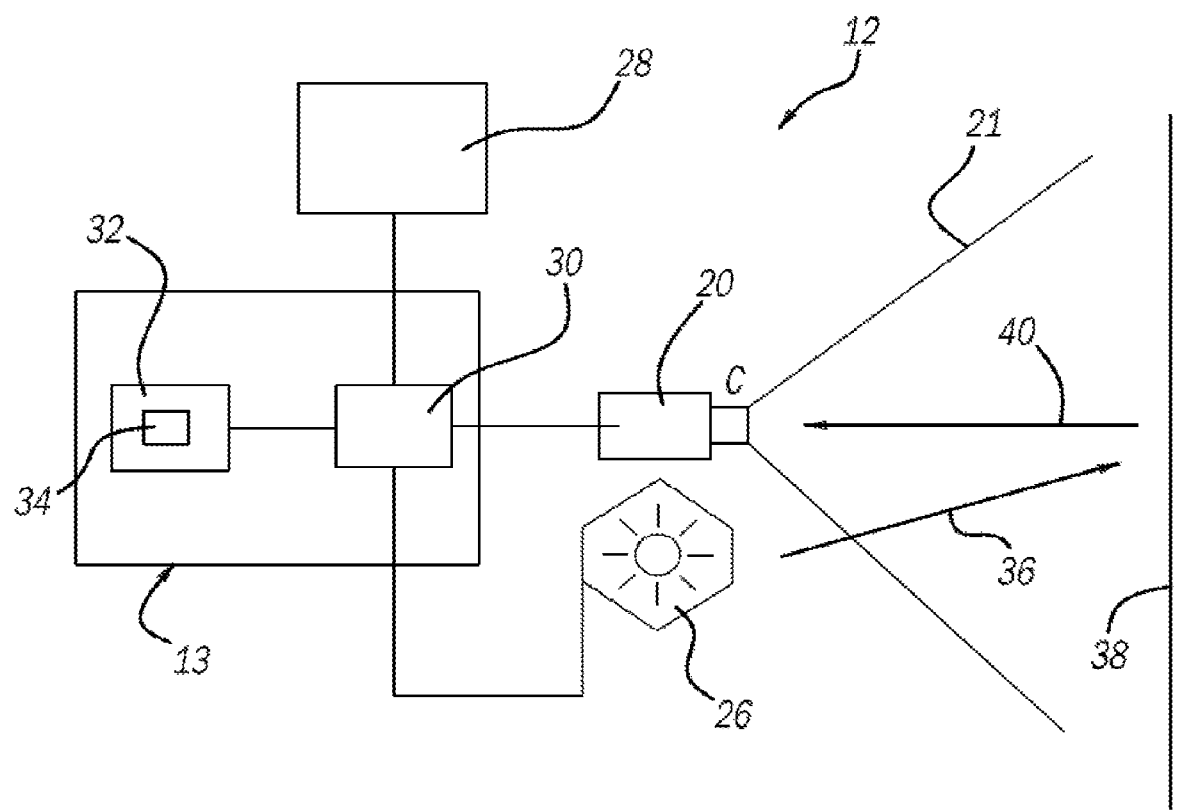
FIG. 6 illustrates a block diagram of the system for determining whether a seatbelt is fastened.

Referring to FIG. 6, a more detailed illustration of the control system 12 is shown. Here, the control system 12 includes controller 13 that includes a processor 30. The processor 30 may be in communication with a memory 32 that contains instructions 34 for executing any one of a number of different methods disclosed in this specification. The processor 30 may be a single stand-alone processor or may be multiple processors spread across multiple systems working in concert. The memory 32 may be any type of memory capable of storing digital information. As such, the memory may be solid-state memory, magnetic memory, optical memory, and the like. Additionally, it should be understood that the memory 32 may be incorporated within the processor 30 or may be separate from the processor 30 as shown.

The processor 30 may also be in communication with a camera 20. The camera 20 may be the same as cameras 20A-20F shown and described in FIG. 5. The camera 20, like the cameras 20A-20F in FIG. 5, may be an infrared camera. It should also be understood that the camera 20 may be multiple cameras, such as cameras 20A-20F illustrated in FIG. 5. The camera 20 has a field of view 21.

The infrared light source 26 may also be in communication with the processor 30. When activated by the processor 30, the infrared light source 26 projects infrared light 36 to an object 38 which may either absorb or reflect infrared light 40 towards the camera 20 wherein the camera can capture images illustrating the absorbed or reflected infrared light 40. These images may then be provided to the processor 30.

The processor 30 may also be in communication with the output device 28. As stated previously, the output device 28 may be a visual or audible output device capable of providing information to one or more occupants located within the cabin 14 of FIG. 5. Additionally, it should be understood that the output device 28 could be a vehicle system, such as a safety system that may take certain actions based on input received from the processor 30. For example, the processor 30 may instruct the output device 28 to limit or minimize the functions of the vehicle 10 of FIG. 4. As will be explained later in this specification, one of the functions that the control system 12 may perform is detecting if an occupant is properly wearing a safety belt. If the safety belt is not properly worn, the processor 30 could instruct the output device 28 to limit the functionality of the vehicle 10, such that the vehicle 10 can only travel at a greatly reduced speed.

Figure 7:
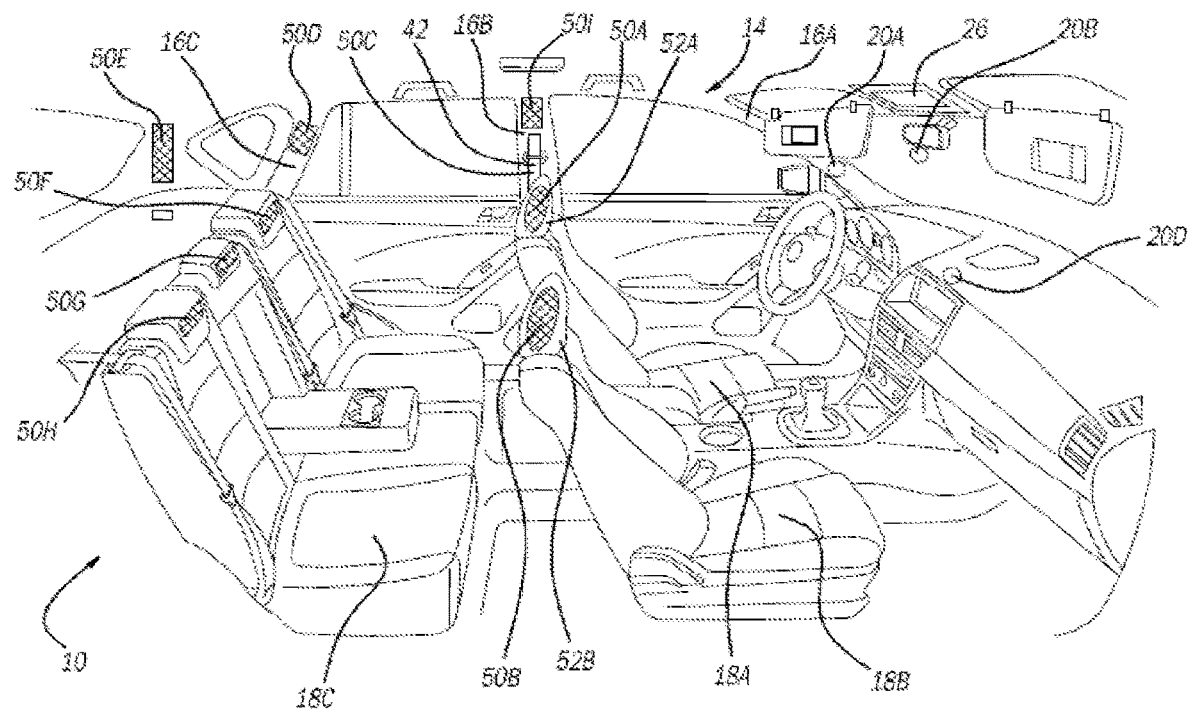
FIG. 7 illustrates a side view of a cabin of the vehicle having a system for determining whether a seatbelt is fastened.

Referring to FIG. 7, a side view of the cabin 14 of the vehicle 10 is shown. Like before, the cabin 14 may be defined by A-pillar 16A, B-pillar 16B, and C-pillar 16C. Of course, like before, it should be understood that the cabin 14 of the vehicle 10 may include any one of a number of different pillars so as to define the cabin 14. Additionally, it is also possible that the cabin 14 may be defined without the use of pillars. The cabin 14 also includes seats 18A and 18B for supporting the occupants located within the cabin 14 and may also include a rear seat 18C for supporting passengers in the backseat.

Here, different objects located within the cabin 14 of the vehicle 10 have surfaces that have amounts of absorbing and/or reflecting material 50A-50I located thereon. The material 50A-50I may either reflect and/or absorb light. This light that may be reflected and/or absorbed by the material 50A-50I may be infrared light generated by the infrared light source 26. This reflection or absorption of the infrared light may be detected by the cameras 20A-20F located and mounted to the vehicle 10 so as to capture a field of view of the cabin 14. The reflecting and absorbing material may be utilized to form the patterns and/or markers on a seatbelt as described with regard to FIG. 1-3.

As stated before, the selective wavelength interactive material 50A-50H may be located in any one of a number of different objects located within the cabin 14 and within the field of view of cameras 20A-20F. The selective wavelength interactive material 50A-50H may be reflecting and/or absorbing material, whereby the material 50A-50H may reflect and/or absorb light at one or more wavelengths, such as infrared. For example, the reflecting and/or absorbing material 50A and 50B may be located on a movable surface of a movable structure, such as the headrest 52A and 52B of the seats 18A and 18B respectively. The headrest 52A and 52B may be movable either independently or with the seats 18A and 18B. Furthermore, it should be understood that the reflective or absorbing material may also be located on the surface of the rear seats 18C, as shown in this example, in the headrest as reflecting or absorbing material 50F, 50G, and 50H.

The reflecting and/or absorbing material may also be located on a fixed structure located within the cabin 14. Here, the reflecting and/or absorbing material may be located on the B-pillar 16B as material 50I. The material may be also located on the C pillar 16C as material 50D. Additionally, the reflecting and/or absorbing material may be located elsewhere in the vehicle as illustrated as 50E. As will be explained later in this specification, the cameras 20A-20F can be calibrated based on the known distance to these fixed structures.

In addition to being located on movable or fixed structures, the reflecting and/or absorbing material may also be located on a safety belt 42 as material 50C. As such, because of the light reflecting and/or light absorbing properties of the material 50C, the cameras 20A-20F can more clearly see the safety belt 42 and if the occupant located within the cabin 14 is properly utilizing the safety belt 42 as will be described later in this specification.

Referring to FIG. 8A-8G, a more detailed view of the reflecting and/or absorbing material is shown. The reflecting and/or absorbing material 50, as stated previously, may be disposed on a surface of one or more objects located within the cabin of the vehicle. The reflecting and/or absorbing material may be in the form of a thread that is configured to reflect and/or absorb light, such as infrared light, or may be a paint or ink that may be deposited on a surface so as to reflect and/or absorb light, such as infrared light.

Figure 8A:
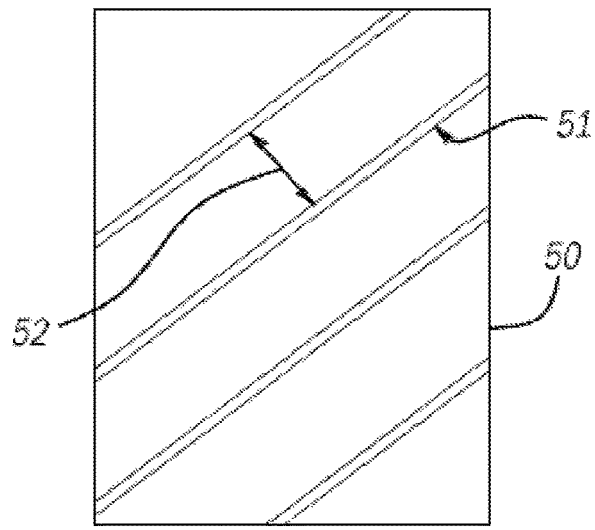
FIGS. 8A-8G illustrate more detailed views of the reflecting and/or absorbing material.
Figure 8B:
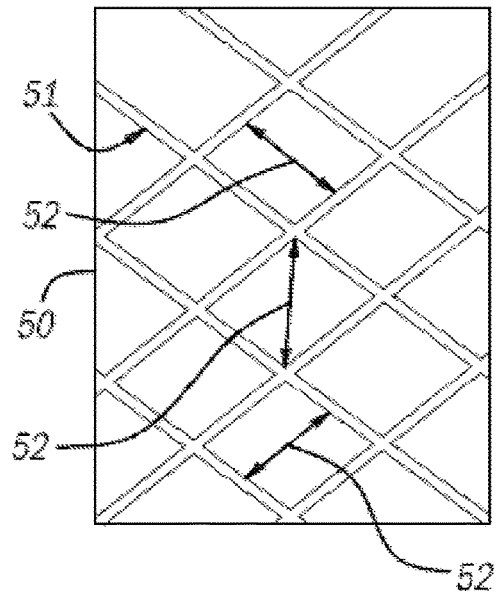

As shown in FIG. 8A-8G, the reflecting and/or absorbing material 50 may be deposited in the form of a pattern having pattern elements 51. FIG. 8A illustrates the pattern as a plurality of diagonal lines. These diagonal lines are essentially pattern elements that are in a known arrangement spaced apart from one another at a known distance 52. FIG. 8B illustrates a crosshatch pattern wherein the pattern elements 51 are spaced apart from each other by a known distance 52.

Figure 8C:
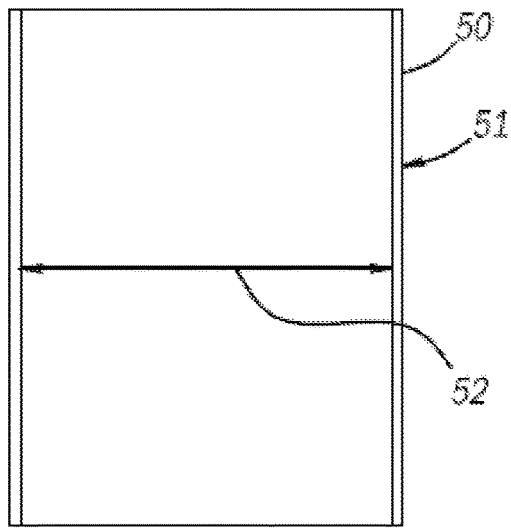
Figure 8D:
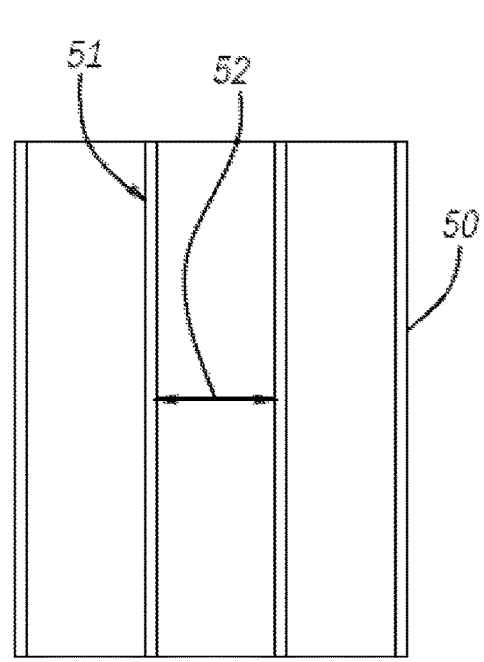

FIG. 8C and 8D illustrate yet another example of the pattern having pattern elements 51. In FIG. 8C there is shown just two pattern elements separated by a distance 52. FIG. 8D shows four separate pattern elements 51 separated by a distance 52. Again, the distance 52 is a known distance and will be useful as will be described later in this specification, so as to calibrate the cameras 20A-20F and/or detect the safety belt 42.

Figure 8E:
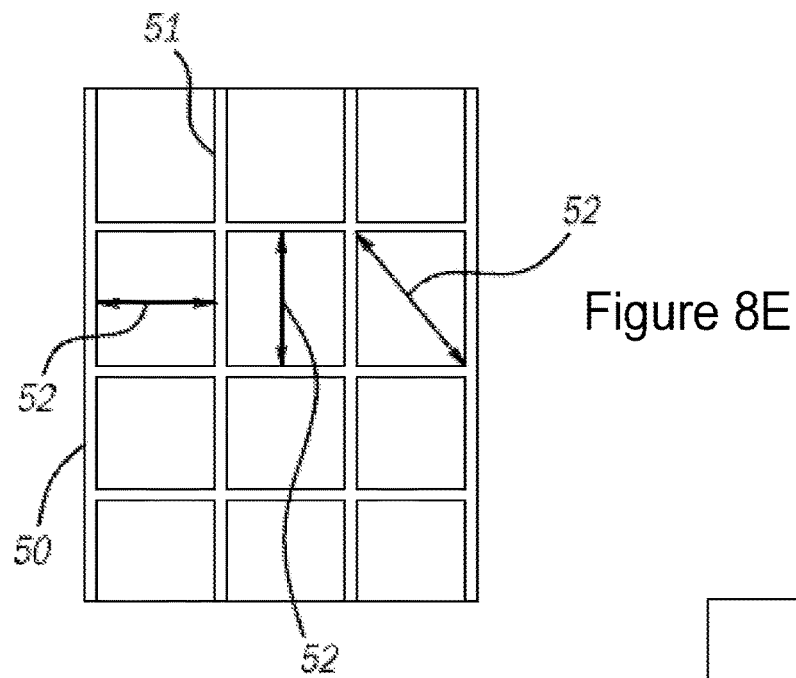
Figure 8F:
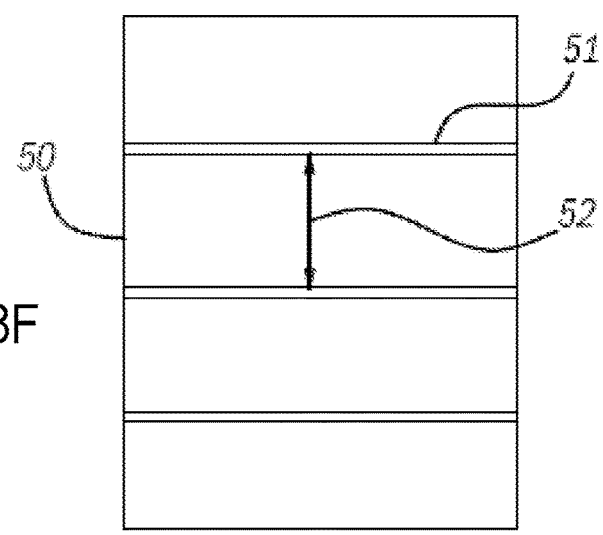
Figure 8G:
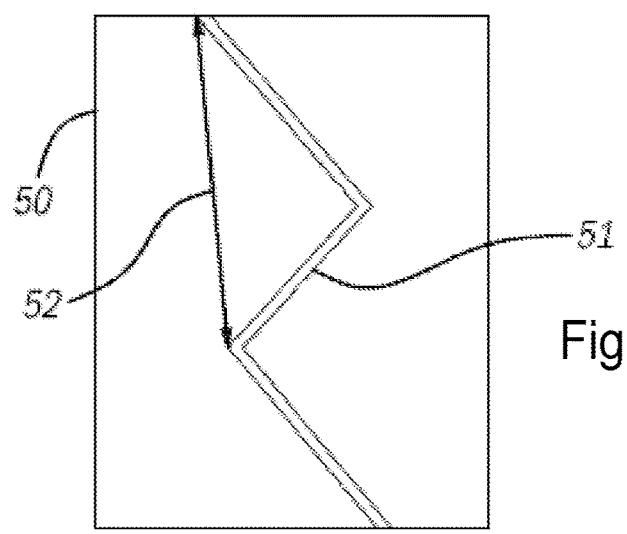

FIG. 8E illustrates a square pattern having a plurality of pattern elements 51 that are separated from each other by a known distance 52. This known distance may be horizontal, vertical, or diagonal, as shown. FIG. 8F shows a plurality of pattern elements 51 being in the form of horizontal lines separated by a known distance 52. Finally, FIG. 8G illustrates yet another embodiment of the pattern elements 51. In this case, the pattern elements 51 are shown as a zig-zag formation wherein the zig-zag is in a known arrangement and contains dimensions that are separated from each other by a known distance 52.

It should be understood that the pattern elements 51 may be either the reflecting or absorbing portion so as to reflect or absorb light, such as infrared light. It should also be understood that the examples of the patterns shown in FIG. 8A-8G are merely examples in any one of a number of different patterns or designs may be utilized. Generally, any pattern or design utilized will have a known arrangement wherein different pattern elements are located at a distance from each other by a known distance. Again, this known distance is useful in calibrating the cameras 20A-20F for determining the distance from the one or more cameras 20A-20F to the material 50.

Figure 9:
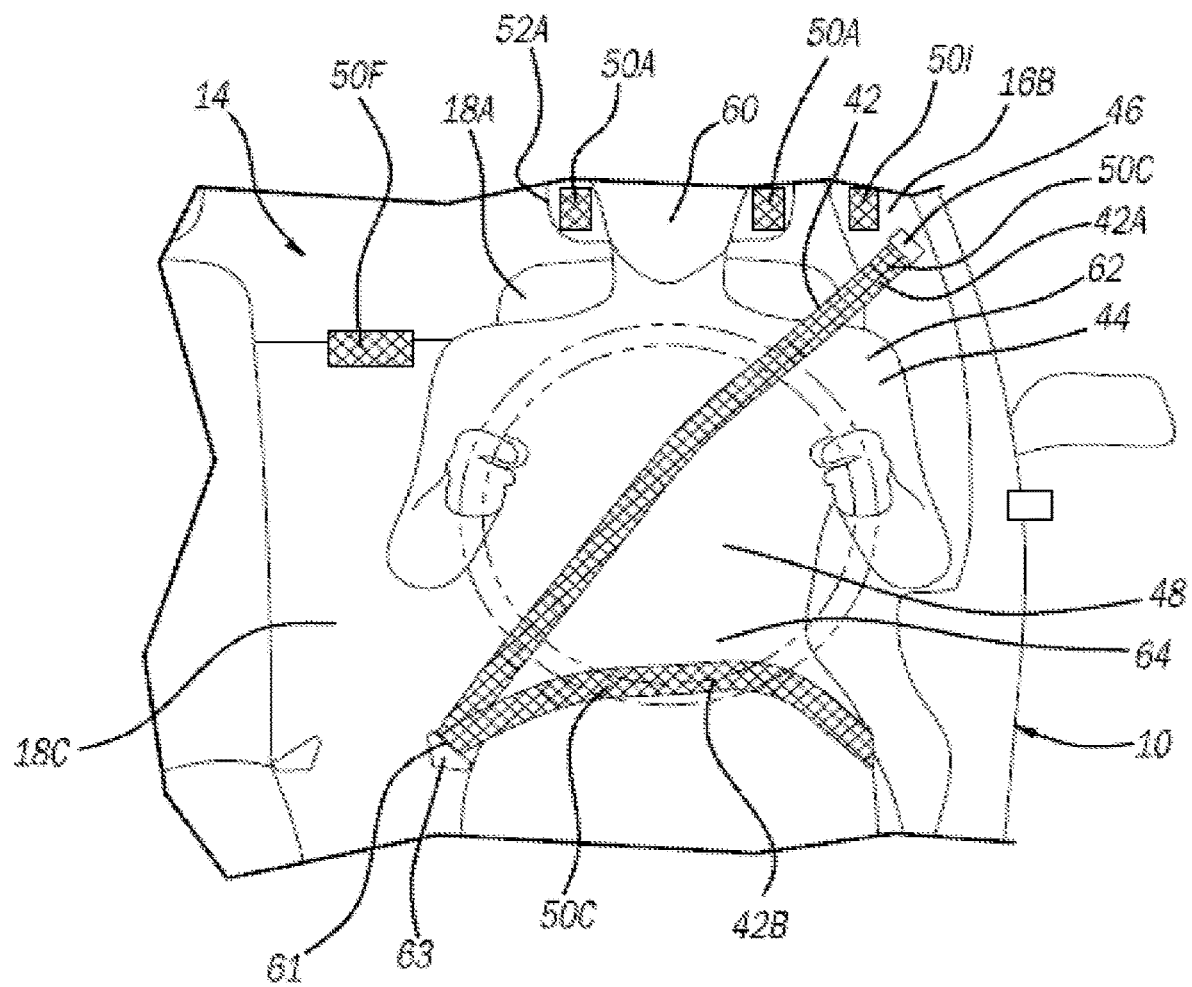
FIG. 9 illustrates a rearward looking view of a portion of a cabin of the vehicle having a system for determining whether a seatbelt is fastened.

Referring to FIG. 9, a view of the cabin 14 from the front of the vehicle 10 looking to the rearward of the vehicle 10 is shown. Here, located within the seat 18A is an occupant 44 having a body 48. The body 48 may also include a head 60 and shoulder 62. Here, as can be seen, also shown is the headrest 52A. The material that is capable of reflecting and/or absorbing light, such as infrared light is shown as previously described on several elements, including the safety belt 42, the B-pillar 16B, the headrest 52A and a rear seat 18C. Here, the cameras 20A-20F that have a field of view of the cabin 14 of the vehicle 10 have been configured to see the absorbing and/or reflecting material 50A (disposed on the vehicle headrest 52A), 501 (disposed on the B-pillar 16B), 50F (disposed in the rear seat 18C), and 50C (disposed along the safety belt 42).

As described in FIG. 8A-8G, it was mentioned that the light reflecting and/or absorbing material 50A-50I may have a pattern with pattern elements in a known arrangement. Furthermore, it was described that these pattern elements may be separated from each other by a known distance 52. Because this distance that separates the pattern elements is known, the cameras 20A-20F can capture images that show the material 50A-50I having the pattern in pattern elements as well as the distances between these pattern elements.

With this in mind, the cameras 20A-20B may be configured to capture the pattern elements from material 501 which, as stated previously, is on a fixed surface of a fixed structure, e.g. the B-pillar 16B. Because the control system 12 has been configured to know the distance between these pattern elements, the control system 12 can utilize the captured image to determine the distance between the pattern elements of the material 501. Based on the distance in comparison of the distance between the pattern elements in the images captured by the cameras 20A-20F and the known or expected pattern elements, a comparison can be made as to the distance of the cameras to the material 501. Based on this compared distance, the control system 12 can determine the location of the cameras 20A-20F in relation to the material 501 which is located on a fixed and unmovable structure—the B-pillar 16B.

Moreover, as the distance between the pattern elements increases in the images captured by the one or more camera 20A-20E, this is an indication that one or more of the cameras 20A-20F are closer to the material 501. Conversely, as the distance between the pattern elements decrease, this is an indication that one or more of the cameras 20A-20F are farther away from the material 501. By comparing the measured distance from the captured images to an expected or known measured distance, a determination can be made of the positions of the one or more of the cameras 20A-20F in relation to the fixed structure—the B-pillar 16B. This determination of the position of the 20A-20F in relation to the fixed structure—the B-pillar 16B can be used calibrate the cameras.

The system may also be configured to determine if the occupant 44 is properly utilizing the safety belt 42. Here, the cameras 20A-20F may capture images and provide them to the control system 12. The processor 30 of the control system 12 of FIG. 6 may then execute a method for determining if the safety belt 42 is properly located and being properly utilized by the occupant 44.

Here, the control system 12 may determine that portions of the safety belt 42 are located across the body 48 of the occupant 44. This determination may be made based on the safety belt 42 stretching from the shoulder 62 of the occupant and across the body 48 of the occupant 44 or may be determined by portions 42B of the safety belt 42 that stretch across a lap 64 which is part of the body 48 of the occupant 44. Again, what is important is that the control system 12 be able to receive images that indicate that the safety belt is stretching across the body 48 of the occupant in some form.

Additionally, the algorithm executed by the processor 30 may also check to see if a portion of the safety belt 42 is stretching from between a shoulder 62 of the occupant 44 and a webbing guide 46 that functions to guide the webbing of the safety belt 42 from the B-pillar 16B or alternatively, portions of the seat 18A. The algorithm executed by the processor 30 may also be configured so as to detect the head 60 and the shoulder 62 so as to better mark the placement of a portion 42A of the safety belt 42 located between the shoulder 62 and the webbing guide 46.

By executing the algorithm described in this specification, the control system 12 can determine if the occupant 44 is properly wearing their safety belt 42. Of course it is possible that the occupant 44 may not be wearing the safety belt properly, but the system and method improves the confidence that the occupant 44 is properly wearing the safety belt 42.

In addition, as stated previously, the safety belt 42 may have light absorbing and/or reflecting material 50C located on or disposed on the safety belt 42. The cameras 20A-20F can capture images of the material 50C. As stated before, this material 50C may be in a known pattern having pattern elements that are separated from each other by known distances 52. The control system 12 can then review these captured images from the camera 20A-20F and determine if the distance of the safety belt 42 to the camera is generally an expected distance indicating that the safety belt 42 is properly across the body 48 of the occupant 44. In addition, because this pattern is known, clothing that the occupant 44 may be wearing that may reflect and/or absorb light, such as infrared light, can be ignored as it is highly unlikely that the clothing worn by the occupant would have a pattern similar to that of the pattern of the material 501 located on the safety belt 42.

If a determination is made that the occupant 44 is properly wearing the safety belt 42, the control system 12 can allow the vehicle 10 to operate in a normal mode. However, if the control system 12 indicates that the occupant 44 is not properly wearing the safety belt 42, the control system 12 could take any one of a number of different actions. For example, the control system 12 could indicate to the occupant 44 using the output device 28 so as to provide a visual and/or audible cue that the safety belt 42 is not being properly worn. Additionally, the output device 28 could be in communication with any one of a number of different vehicle systems so as to restrict the operation of the vehicle 10 until the safety belt 42 is being properly worn by the occupant 44.

The control system 12 may also be in communication with other control systems so as to improve the reliability of the system. For example, the control system 12 may also be in communication with one or more sensors, such as the sensors that detect the safety belt latch 61 or tongue is inserted into the safety belt buckle 63. If the control system 12 determines that the safety belt buckle is properly latched and determines that the safety belt 42 is properly positioned across the body 48 of the occupant 44, the control system 12 can with more confidence, determine that the safety belt 42 is being properly utilized by the occupant 44.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A control system for determining whether a seatbelt of a vehicle is fastened, the control system comprising:
a vision system configured to have a field of view of at least a portion of a cabin of the vehicle, the vision system configured to capture one or more images of the field of view of at least the portion of the cabin of the vehicle;
a controller in communication with the vision system, the controller being configured to activate a seatbelt tensioner; and
wherein the vision system is configured to identify a first location of one or more markers on the seatbelt before the seatbelt tensioner is activated, and a second location of the one or more markers on the seatbelt after the seatbelt tensioner has been activated, and the control system is configured to determine whether the seatbelt is fastened by comparing a distance between the first location and the second location of the one or more markers to a threshold distance.

2. The control system of claim 1, wherein the vision system is configured to illuminate the field of view with a non-visible wavelength and the at least one or more markers is configured to be detectable at the non-visible wavelength.

3. The control system of claim 1, wherein the controller is configured to identify the first location, identify the second location and determine whether the seatbelt is fastened in response to a door of the vehicle opening.

4. The control system of claim 1, wherein the controller is configured to identify the first location, identify the second location and determine whether the seatbelt is fastened in response to the vehicle starting or stopping.

5. The control system of claim 1, wherein the controller is configured to identify the first location, identify the second location and determine whether the seatbelt is fastened in response to a timer determining a time period has elapsed since last determining whether the seatbelt is fastened.

6. The control system of claim 1, wherein the controller is configured to alert a driver in response to a difference between the first location and the second location.

7. The control system of claim 1, wherein the controller is configured to determine that the seatbelt is unfastened when the distance between the first location and the second location is above the threshold distance.

8. The control system of claim 1, wherein the controller is configured to determine that the seatbelt is fastened when the distance between the first location and the second location is below the threshold distance.

9. The control system of claim 1, wherein the controller is configured to determine whether the seatbelt is fastened based on not finding the one or more markers in the field of view before the tensioner is engaged.

10. The control system of claim 1, wherein the controller is configured to determine whether the seatbelt is fastened based on not finding the one or more markers in the field of view after the tensioner is engaged.

11. A method for determining whether a seatbelt of a vehicle is fastened, the method comprising the steps of:
    detecting one or more markers on the seatbelt;
    engaging a seatbelt tensioner;
    determining whether the markers have moved from a first location before the tensioner is activated and a second location after the seatbelt tensioner is activated; and
    determining whether the seatbelt is fastened by comparing a distance difference between the first and second locations of the one or more markers to a threshold distance.

12. The method of claim 11, wherein a field of view is illuminated with a non-visible wavelength and wherein the one or more markers are configured to reflect at the non-visible wavelength.

13. The method of claim 11, wherein detecting the one or more markers and determining whether the seatbelt is fastened is in response to a door of the vehicle opening.

14. The method of claim 11, wherein detecting the one or more markers and determining whether the seatbelt is fastened in response to the vehicle starting or stopping.

15. The method of claim 11, wherein detecting the one or more markers and determining whether the seatbelt is fastened in response to a timer determining a time period has elapsed since last determining whether the seatbelt is fastened.

16. The method of claim 11, further comprising alerting a driver in response to a difference between the first location of the one or more markers and the second location of the one or more markers.

17. The method of claim 11, further comprising determining that the seatbelt is unfastened when a distance between the first location of the one or more markers and the second location of the one or more markers is above the threshold distance.

18. The method of claim 11, further comprising determining that the seatbelt is fastened when a distance between the first location of the one or more markers and the second location of the one or more markers is below the threshold distance.

19. The method of claim 11, further comprising determining whether the seatbelt is fastened based on not finding the one or more markers in a field of view before the tensioner is engaged.

20. The method of claim 11, further comprising determining whether the seatbelt is fastened based on not finding the one or more markers in a the field of view after the tensioner is engaged.

* * * * *